United States Patent [19]

Itagaki et al.

[11] Patent Number: 4,970,607
[45] Date of Patent: Nov. 13, 1990

[54] FULL-SIZE IMAGE SENSOR

[75] Inventors: Masanori Itagaki, Yokohama; Yoshio Watanabe, Kawasaki, both of Japan

[73] Assignee: Ricoh Company, Ltd., Tokyo, Japan

[21] Appl. No.: 389,812

[22] Filed: Aug. 4, 1989

[30] Foreign Application Priority Data

Aug. 11, 1988 [JP] Japan .................. 63-201419

[51] Int. Cl.⁵ .............................. H04M 1/04
[52] U.S. Cl. ...................... 358/482; 358/493; 250/208.1
[58] Field of Search .............. 358/482, 483, 471, 484; 250/578

[56] References Cited

U.S. PATENT DOCUMENTS 3,544,713 12/1970 Case .................................... 358/482
4,446,364 5/1984 Hayashi et al. ...................... 358/482
4,805,032 12/1989 Watanabe et al. ................... 358/482

Primary Examiner—Edward L. Coles, Sr.
Attorney, Agent, or Firm—Oblon, Spivak, McClelland, Maier & Neustadt

[57] ABSTRACT

A full-size image sensor includes a plurality of photoelectric conversion elements formed on a substrate and arranged into a line. A photosensitive surface of each of the photoelectric conversion elements is perpendicular to a document to be scanned. A transparent layer is formed on the substrate so as to cover the photoelectric conversion elements. A light reflecting layer made of a light interrupting member is formed on the transparent layer so as to prevent light emitted from a light source from being directly projected onto the photoelectric conversion elements. The light emitted from the light source is reflected on the document and then projected onto the photoelectric conversion elements directly or after being reflected by the light reflecting layer.

20 Claims, 4 Drawing Sheets

FULL-SIZE IMAGE SENSOR

BACKGROUND OF THE INVENTION

The present invention generally relates to a full-size image sensor, and particularly to a full-size line sensor which can be applied to an optical reader provided in a facsimile machine, a digital copier, a handy scanner and so on.

FIG.1 is a cross sectional view of a conventional total contact type full-size image sensor (see Japanese Patent Publication No. 58-14073 or 58-46182, or U.S. Pat. No. 4,805,032). Referring to FIG.1, light emitted from a light source (not shown) passes through a window W formed in a light interrupting layer 2 mounted on a substrate 8, and then passes through a transparent protection layer 3 so as to cover photoelectric conversion elements 1 arranged into a line. Then, the light is projected onto a document 5, which is fed by a platen roller 4, and is reflected thereon. The quantity of the reflected light is based on image information formed on the document 5. The reflected light passes through the transparent protection layer 3 and is projected onto the photoelectric conversion elements 1, which convert the received light into corresponding electric signals.

The image sensor shown in FIG.1 does not require a full-size imaging element such as a selfoc lens array (SLA). In view of this point, the efficiency in use of light is high and thus a high signal-to-noise ratio can be obtained.

However, the document 5 pressed by the platen roller 4 slides directly on the transparent protection cover 3. This causes a flaw on the surface of the transparent protection cover 3. Further, the transparent protection cover 3 may be worn away over a long period of time. The occurrence of flaw or wear affects the incident light or the reflected light. As a result, time deterioration of S/N ratio and resolution is caused. Moreover, the following disadvantage is presented when an external integrated circuit chip 7 serving as a peripheral circuit (drive circuit) for the photoelectric conversion elements 1 is used together with the image sensor. In this case, the substrate 8 is necessary to have a width sufficient to prevent bonding wires 6 for connecting bonding pads (not shown) formed on the substrate 8 and the integrated circuit chip 7 from coming into contact with the platen roller 4 or the document 5. In order to reduce the size of the substrate 8, it is conceivable that each photoelectric conversion element is formed as small as possible. However, a reduced photoelectric conversion element is affected by static electricity. This increases noise or causes a malfunction of the peripheral circuit (drive circuit) formed in the integrated circuit chip 7.

SUMMARY OF THE INVENTION

It is an object of the present invention to provide an improved full-size image sensor in which the above-mentioned disadvantages are eliminated.

A more specific object of the present invention is to provide a full-size image sensor of high S/N ratio, high resolution, low cost and high reliability.

The above objects of the present invention can be achieved by a full-size image sensor comprising a substrate, a plurality of photoelectric conversion elements formed on the substrate and arranged into a line, a photosensitive surface of each of the photoelectric conversion elements being perpendicular to a document to be scanned, a transparent layer formed on the substrate so as to cover the photoelectric conversion elements, and a light reflecting layer made of a light interrupting member. The light reflecting layer is formed on the transparent layer so as to prevent light emitted from a light source from being directly projected onto the photoelectric conversion elements. The light emitted from the light source is reflected on the document and then projected onto the photoelectric conversion elements directly or after being reflected by the light reflecting layer.

The aforementioned objects of the present invention can also be achieved by a full-size image sensor comprising a substrate, a plurality of photoelectric conversion elements formed on the substrate and arranged into a line, a photosensitive surface of each of the photoelectric conversion elements being perpendicular to a document to be scanned, a transparent layer formed on the substrate so as to extend above the photoelectric conversion elements, the transparent layer having an inner surface facing the photoelectric conversion elements, and a light reflecting layer made of a light interrupting member. The light reflecting layer is formed on the inner surface of the transparent layer so as to prevent light emitted from a light source from being directly projected onto the photoelectric conversion elements. The light emitted from the light source is reflected on the document and then projected onto the photoelectric conversion elements directly or after being reflected by the light reflecting layer.

Other objects, features and advantages of the present invention will become apparent from the following detailed description when read in conjunction with the accompanying drawings.

DESCRIPTION OF THE PREFERRED EMBODIMENTS

Figure 1:
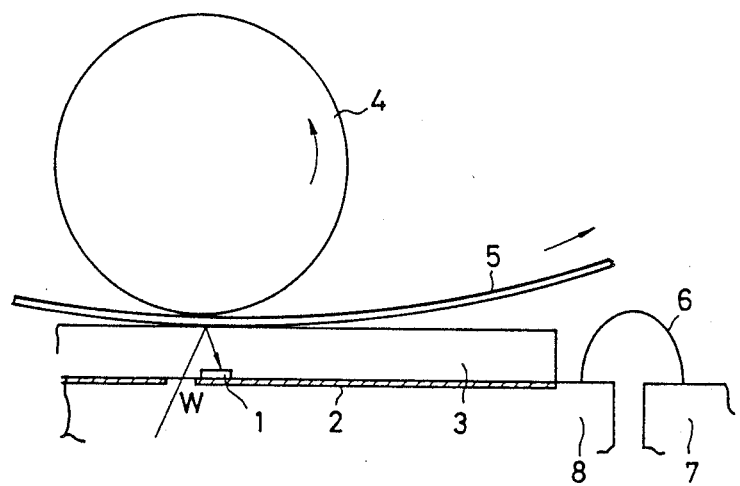
FIG.1 is a cross sectional view of a conventional total contact type full-size image sensor.
Figure 2:
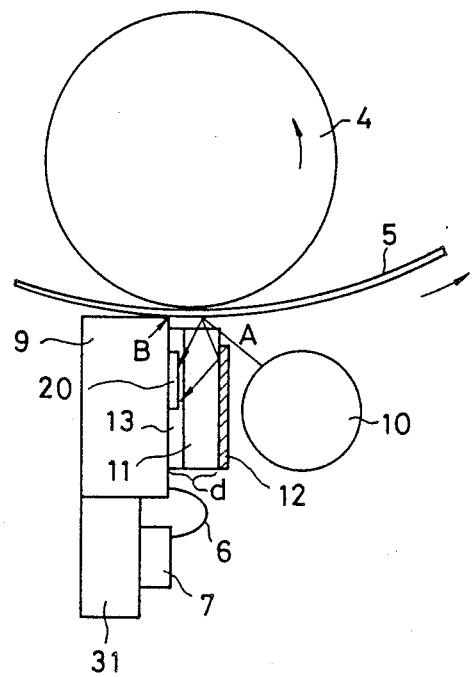
FIG.2 is a cross sectional view of a first preferred embodiment of the present invention.
Figure 3:
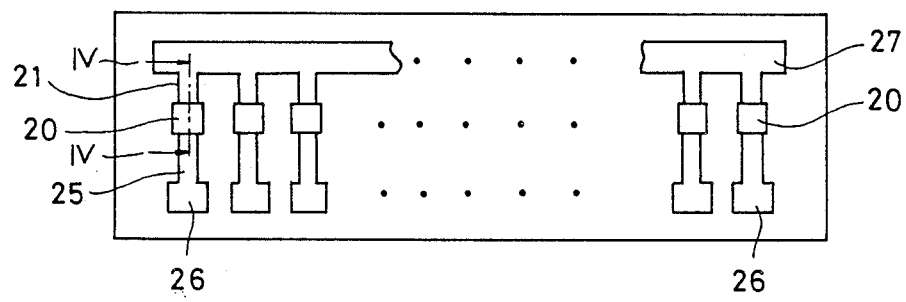
FIG.3 is a plan view of the first embodiment shown in FIG.2.
Figure 4:
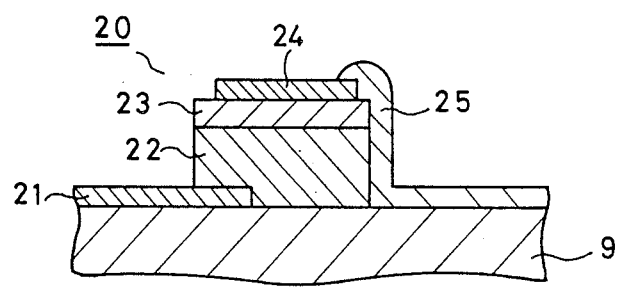
FIG.4 is a cross sectional view taken along a line IV—IV shown in FIG.2.

A description is given of a first preferred embodiment of the present invention with reference to FIGS.2 through 4.

A plurality of photoelectric conversion elements 20 are arranged into a line on an insulating substrate 9, which is between 0.5 to 3 mm in thickness, for example. The insulating substrate 9 can be formed of a transparent material such as silicon oxide ($SiO_2$), and alternatively a light interrupting material. The insulating substrate 9 may be supported by a base member (not shown). A thin glass plate 11 of a thickness equal to between 30 to 100 $\mu$m is mounted on the transparent substrate 9 and the photoelectric conversion elements 20 through an optical adhesive layer 13. A light interrupting layer 12 is mounted on the thin glass plate 11. The light interrupting layer 12 prevents light emitted from a light source 10 from being directly projected on the photoelectric conversion elements 20. The light interrupting layer 12 also serves a light reflecting layer. Hereinafter, the light interrupting layer 12 is referred to as light reflecting layer. An end portion of each of the optical adhesive layer 13 and the thin glass plate 11 which faces the platen roller 4 is located inside the end of the insulating substrate 9. This arrangement intends to prevent the optical adhesive layer 13 and the thin glass plate 11 from coming contact with the document. An end of the light reflecting layer 12 facing the platen roller 4 is located so that a large amount of incident light emitted from the light source 10 is projected onto the document 5 without being directly projected onto the photoelectric conversion elements 20. In other words, an exposed surface portion of the thin glass plate 11 serves as a lighting window A. It is preferable that the width of the lighting window A in the vertical direction be approximately equal to a length d where d is equal to the sum of the thickness of the optical adhesive layer 13 and the thickness of the thin glass glass 11. The light reflecting layer 12 is formed of chromium, aluminum or chromium/aluminum, which can be formed on the thin glass plate 11 by an evaporation process, for example.

The photoelectric conversion elements 20 are arranged so that at least a part of each of the photoelectric conversion elements 20 is located at a distance of 2×d from an end B of the insulating substrate 9 in the vertical direction. This is because if the photoelectric conversion elements 20 are apart from the end B at a distance of more than 2×d, the quantity of the incident light considerably decreases and thus resolution is deteriorated.

The image sensor thus formed is positioned with respect to the document 5 so that a photosensitive surface of each of the photoelectric conversion elements 20 is approximately perpendicular to the surface of the document 5, which is transported by the platen roller 4. Light emitted from the light source 10 is projected through the lighting window A or directly onto an area on the document 13 in the vicinity of the end B of the insulating substrate 9. The reflected light having the intensity based on image information on the projected area is projected onto the photoelectric conversion elements 20 directly or after it is reflected on a back surface of the light reflecting layer 12 which faces the photoelectric conversion elements 20.

FIG.4 is a cross sectional view taken along a line IV—IV shown in FIG.3. Referring to FIG.4, an electrode 21 made of Cr for example is formed on the surface of the insulating substrate 9. An amorphous silicon layer 22 is formed on a part of the Cr electrode 21 and on the surface of the insulating substrate 9. A silicon oxynitride (SiON) layer 23 is formed on the amorphous silicon layer 22. An indium tin oxide (ITO) layer 24 is formed on the SiON layer 23. The ITO layer 24 may be formed directly on the amorphous silicon layer 22 without using the SiON layer 23. An electrode 25 made of Al for example extends from the ITO layer 24 along a side wall of the stacked layer structure, and is laid on the surface of the insulating substrate 9. The structure of each of the photoelectric conversion elements 20 is not limited to that shown in FIG.4, and another conventional structure may be employed.

As shown in FIG.3, the Al electrodes 25 are connected to respective bonding pads 26 formed on the insulating substrate 9, and the Cr electrodes 21 are connected to a common electrode 27 formed on the insulating substrate 9. In FIG.3, the light reflecting layer 12 is omitted for convenience' sake.

The integrated circuit chip 7 mounted on a base 31 is used together with the image sensor as shown in FIG.2. It is noted that positioning of the image sensor or the size of the insulating substrate 9 is not affected by the presence of the IC chip 7 or bonding wires 6. Further, the thin glass plate 11 is not in contact with the document 5. Thus, no flaw and wear occur in the thin glass plate 11 or in other words, no age deterioration occurs. This means that the incident light or reflected light is not affected. As a result, according to the present invention, it becomes possible to provide an image sensor of high S/N ratio, high resolution, and high reliability. Moreover, the size of the photoelectric conversion elements 20 may be larger than that of the conventional photoelectric conversion element because it is not necessary to take into account the presence of the bonding wires 6 and integrated circuit chip 7. Therefore, the image sensor according to the present invention is resistant to static electricity. The end B of the insulating substrate 9 may be chamfered so that the document 5 can smoothly slide thereon.

Figure 5:
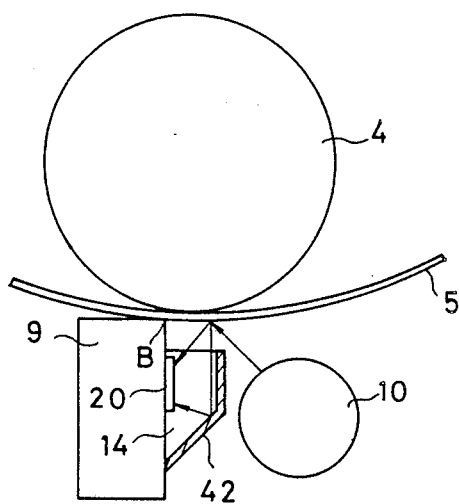
FIG.5 is a cross sectional view of a second preferred embodiment of the present invention.

FIG.5 is a cross sectional view of a second preferred embodiment of the present invention. The photoelectric conversion elements 20 are arranged into a line on the insulating substrate 9 in the same manner as those in the first embodiment. A transparent layer 14 is formed on the insulating substrate 9 so as to cover the photoelectric conversion elements 20. The transparent layer 14 can be made of silicon oxide ($SiO_2$), silicon nitride (Si—N) or silicon oxynitride (SiON), for example. The transparent layer 14 can be formed as follows. A transparent layer is deposited to a thickness of 10 to 50 $\mu$m by a chemical vapor deposition process. Thereafter, the deposited transparent layer is patterned on a desired shape, so that the transparent layer 14 is formed. An end surface of the transparent layer 14 facing the platen roller 4 is positioned inside the end B of the insulating substrate 9. This end surface of the transparent layer 14 serves as a lighting window. The transparent layer 14 is of a trapezoidal-shaped cross section. An oblique surface of the transparent layer 14 is opposite to the lighting window. A light reflecting layer 42 is formed on the top surface of the transparent layer 14. The light reflecting layer 42 has the function of not only preventing light reflected on the document 5 from being directly projected onto the photoelectric conversion elements 20 but also reflecting the light so as to goes to the photoelectric conversion elements 20. An oblique portion of the light reflecting layer 42 functions to reflect the light reflected on the document 5 so as to be projected on the photoelectric conversion elements 20. The light reflecting layer 42 can be formed of Cr, Al or Cr/Al by a vapor deposition process or a sputtering process, for example.

Figure 6:
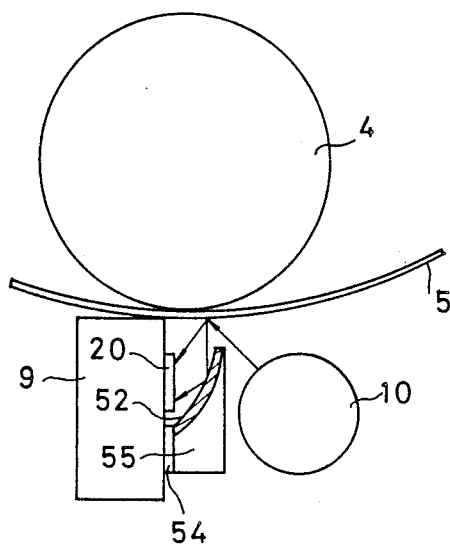
FIG.6 is a cross sectional view of a third preferred embodiment of the present invention.

FIG.6 is a cross sectional view of a preferred third embodiment of the present invention. A thin glass plate 55 is formed on the surface of the insulating substrate 8 through an adhesive layer 54 so as to extend above the photoelectric conversion elements 20. The thin glass plate 55 has a curved inner surface which faces the photoelectric conversion elements 20. The curved inner surface can be formed by subjecting a thin glass plate to a photolithography process or by mechanical cutting. The curved surface of the thin glass plate 55 is concave. A light reflecting layer 52 is formed on the curved inner surface of the thin glass plate 55. The light reflecting layer 52 functions to not only reflect light reflected on the document 5 so as to go to the photoelectric conversion elements 20 but also prevent light emitted from the light source 10 from being directly projected onto the photoelectric conversion elements 9. The light reflecting layer 52 is curved so that the reflected light is directed to the photoelectric conversion elements 20. The light reflecting layer 52 can be formed of Cr, Al or Cr/Al by a vapor deposition process or a sputtering process, for example.

The second and third embodiments have an enhanced efficiency in use of light, as compared with the first embodiment. Thus, the S/N ratio in the second or third embodiment is higher than that for the first embodiment.

Figure 7A:
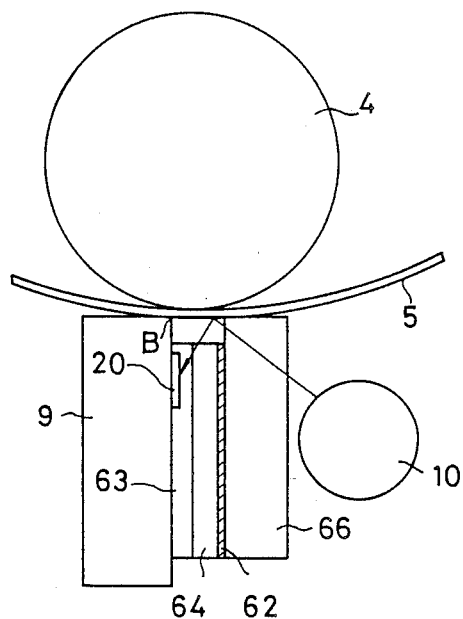
FIGS.7A, 7B and 7C are cross sectional views of a fourth preferred embodiment of the present invention.
Figure 7B:
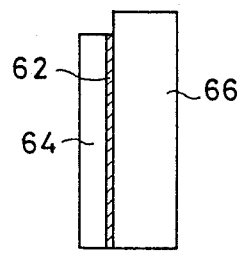
Figure 7C:
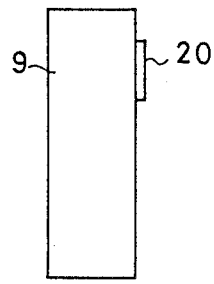

A description is given of a fourth preferred embodiment of the present invention with reference to FIGS.7A through 7C. The fourth embodiment has a layer structure including a layer structure shown in FIG.7B and a layer structure shown in FIG.7C. The photoelectric conversion elements 20 are aligned on the surface of the insulating substrate 9. A transparent layer 64 is formed on the surface of the insulating substrate 9 through an optical adhesive layer 64 so as to cover the photoelectric conversion elements 20. An end portion of the transparent layer 64 facing the platen roller 4 is located inside the end B of the insulating substrate 9. A light reflecting layer 62 is formed on the top surface of the transparent layer 64 in the same manner as the light reflecting layer 12 of the first embodiment. A thick glass plate 66 is formed on the light reflecting layer 62. An end portion which is to face the platen roller 4 projects from the ends of the transparent layer 64 and the light reflecting layer 62. The thick glass plate 66 is 1 to 3 mm thick, for example.

The fourth embodiment can be fabricated as follows. The layer structure shown in FIG.7B is formed independent of the layer structure shown in FIG.7C. Referring to FIG.7B, Cr, Al or Cr/Al is deposited on the thick glass plate 66 and is patterned so that the light reflecting layer 62 is formed. Then, a transparent material such as SiO₂, Si—N or SiON is deposited on the light reflecting layer 62 and is patterned. Thereafter, the layer structure shown in FIG.7B is fastened on the layer structure shown in FIG.7C through the optical adhesive layer 63.

The fourth embodiment presents the following advantages in addition to advantages similar to those by the first to third embodiments. That is, it is possible to fixedly ensure the relative positional relation between the light source 10, the document 5 and the photoelectric conversion elements 20. Further, the photoelectric conversion elements 20 are formed so as to be sandwiched between the two rigid members 9 and 66 and thus increased reliability can be obtained.

The present invention is not limited to the aforementioned embodiments, and variation and modifications may be made without departing from the scope of the present invention.

What is claimed is:

1. A full-size image sensor comprising:
   a substrate;
   a plurality of photoelectric conversion elements formed on said substrate and arranged into a line, a photosensitive surface of each of said photoelectric conversion elements being perpendicular to a document to be scanned;
   a transparent layer formed on said substrate so as to cover said photoelectric conversion elements; and
   a light reflecting layer made of a light interrupting member, said light reflecting layer being formed on said transparent layer so as to prevent light emitted from a light source from being directly projected onto said photoelectric conversion elements,
   said light emitted from said light source being reflected on said document and then projected onto said photoelectric conversion elements directly or after being reflected by said light reflecting layer.

2. A full-size image sensor as claimed in claim 1, wherein said transparent layer includes an exposed surface serving as a lighting window obtained by partially forming said light reflecting layer on said transparent layer, and said light emitted from said light source passes through said light window and is projected onto said document.

3. A full-size image sensor as claimed in claim 2, wherein said transparent layer has an end facing said document and said light reflecting layer has an end facing said document, and the end of said light reflecting layer is positioned at a predetermined distance from the end of said transparent layer.

4. A full-size image sensor as claimed in claim 3, wherein said predetermined distance is approximately equal to the thickness of said transparent layer.

5. A full-size image sensor as claimed in claim 1, wherein said transparent layer has a trapezoidal cross section.

6. A full-size image sensor as claimed in claim 5, wherein said transparent layer has an oblique surface opposite to a surface thereof through which the light reflected by said document passes.

7. A full-size image sensor as claimed in claim 1, further comprising a transparent member formed on said light reflecting layer.

8. A full-size image sensor as claimed in claim 7, wherein said transparent member has a projecting portion which projects from an end of said light reflecting layer facing said document, and said projection portion is in contact with said document.

9. A full-size image sensor as claimed in claim 1, wherein said substrate has an end which is in contact with said document.

10. A full-size image sensor as claimed in claim 9, wherein the end of said substrate is chamfered.

11. A full-size image sensor as claimed in claim 1, wherein each of said photoelectric conversion elements is partially positioned at a distance approximately twice the thickness of said transparent layer.

12. A full-size image sensor as claimed in claim 1, wherein said substrate is formed of an insulating material.

13. A full-size image sensor as claimed in claim 1, wherein said light reflecting layer is approximately 30–100 μm thick.

14. A full-size image sensor as claimed in claim 1, wherein said transparent layer is fastened to said substrate by an adhesive.

15. A full-size image sensor comprising:
   a substrate;
   a plurality of photoelectric conversion elements formed on said substrate and arranged into a line, a photosensitive surface of each of said photoelectric conversion elements being perpendicular to a document to be scanned;

a transparent layer formed on said substrate so as to extend above said photoelectric conversion elements, said transparent layer having an inner surface facing said photoelectric conversion elements; and a light reflecting layer made of a light interrupting member, said light reflecting layer being formed on said inner surface of the transparent layer so as to prevent light emitted from a light source from being directly projected onto said photoelectric conversion elements, said light emitted from said light source being reflected on said document and then projected onto said photoelectric conversion elements directly or after being reflected by said light reflecting layer.

16. A full-size image sensor as claimed in claim 15, wherein said inner surface of the transparent layer is curved.

17. A full-size image sensor as claimed in claim 15, wherein said inner surface is concave.

18. A full-size image sensor as claimed in claim 15, wherein said transparent layer is fastened to said substrate by an adhesive.

19. A full-size image sensor as claimed in claim 15, wherein said substrate includes an end which is positioned in contact with said document.

20. A full-size image sensor as claimed in claim 19, wherein said end of the substrate is chamfered.

* * * * *